United States Patent
Shimizu

(10) Patent No.: US 8,654,409 B2
(45) Date of Patent: Feb. 18, 2014

(54) IMAGE SCANNING APPARATUS AND METHOD FOR CORRECTING SCANNED IMAGE

(75) Inventor: Kosuke Shimizu, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 110 days.

(21) Appl. No.: 13/029,327

(22) Filed: Feb. 17, 2011

(65) Prior Publication Data

US 2012/0013952 A1    Jan. 19, 2012

(30) Foreign Application Priority Data

Jul. 13, 2010    (JP) .................................. 2010-158703

(51) Int. Cl.
*H04N 1/40* (2006.01)
(52) U.S. Cl.
USPC ............ 358/448; 358/475; 358/474; 358/406
(58) Field of Classification Search
USPC .................................. 358/448, 474, 406, 475
See application file for complete search history.

(56) References Cited

U.S. PATENT DOCUMENTS

| 7,911,661 B2 * | 3/2011 | Morisaki | 358/475 |
| 2005/0094215 A1 * | 5/2005 | Nagasaka | 358/406 |
| 2008/0231917 A1 * | 9/2008 | Tsukahara | 358/475 |
| 2010/0231989 A1 * | 9/2010 | Inadome | 358/474 |

FOREIGN PATENT DOCUMENTS

| JP | 2002-300394 A | 10/2002 |
| JP | 2004-64406 A | 2/2004 |
| JP | 2007-235441 A | 9/2007 |
| JP | 2009-025441 A | 2/2009 |
| JP | 2010-068412 A | 3/2010 |

OTHER PUBLICATIONS

Japanese Office Action mailed Dec. 3, 2013 for Japanese application 2010-158703.

\* cited by examiner

*Primary Examiner* — Mark K Zimmerman
*Assistant Examiner* — Michael Burleson
(74) *Attorney, Agent, or Firm* — Sughrue Mion, PLLC

(57) ABSTRACT

An image scanning apparatus includes: an image scanning unit that includes plural light emitting elements and a light receiving portion receiving light emitted from the light emitting elements and reflected on a document and scans an image on the document; a light quantity information acquiring unit that acquires light quantity information on the quantity of light received by the light receiving portion while causing the light emitting elements to irradiate a reference member with light; a correction unit that corrects the scanned image, based on the light quantity information; and an abnormality detecting unit that detects abnormality of the light emitting elements. If the abnormality detecting unit detects the abnormality, the light quantity information acquiring unit acquires new light quantity information while causing the light emitting elements to irradiate the reference member with light and the correction unit corrects the scanned image, based on the new light quantity information.

15 Claims, 6 Drawing Sheets

US 8,654,409 B2

IMAGE SCANNING APPARATUS AND METHOD FOR CORRECTING SCANNED IMAGE

CROSS REFERENCE TO RELATED APPLICATIONS

This application is based on and claims priority under 35 USC §119 from Japanese Patent Application No. 2010-158703 filed Jul. 13, 2010.

BACKGROUND

1. Technical Field

The present invention relates to an image scanning apparatus and a method for correcting a scanned image.

2. Related Art

There is known an image scanning apparatus that has an illumination system of an array-type light source in which plural light emitting elements are arrayed.

SUMMARY

According to an aspect of the present invention, there is provided an image scanning apparatus including: an image scanning unit that includes plural light emitting elements and a light receiving portion receiving light emitted from the plural light emitting elements and reflected on a document and scans an image on the document; a light quantity information acquiring unit that acquires information on the quantity of light received by the light receiving portion as light quantity information while causing the plural light emitting elements to irradiate a reference member with light; a correction unit that corrects the image scanned by the image scanning unit, on the basis of the light quantity information acquired by the light quantity information acquiring unit; and an abnormality detecting unit that detects abnormality of the light emitting elements. The light quantity information acquiring unit acquires information on the quantity of light received by the light receiving portion as new light quantity information while causing the plural light emitting elements to irradiate the reference member with light, if the abnormality of the light emitting elements is detected by the abnormality detecting unit. The correction unit corrects the image scanned by the image scanning unit, on the basis of the new light quantity information acquired by the light quantity information acquiring unit, if the abnormality of the light emitting elements is detected by the abnormality detecting unit.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
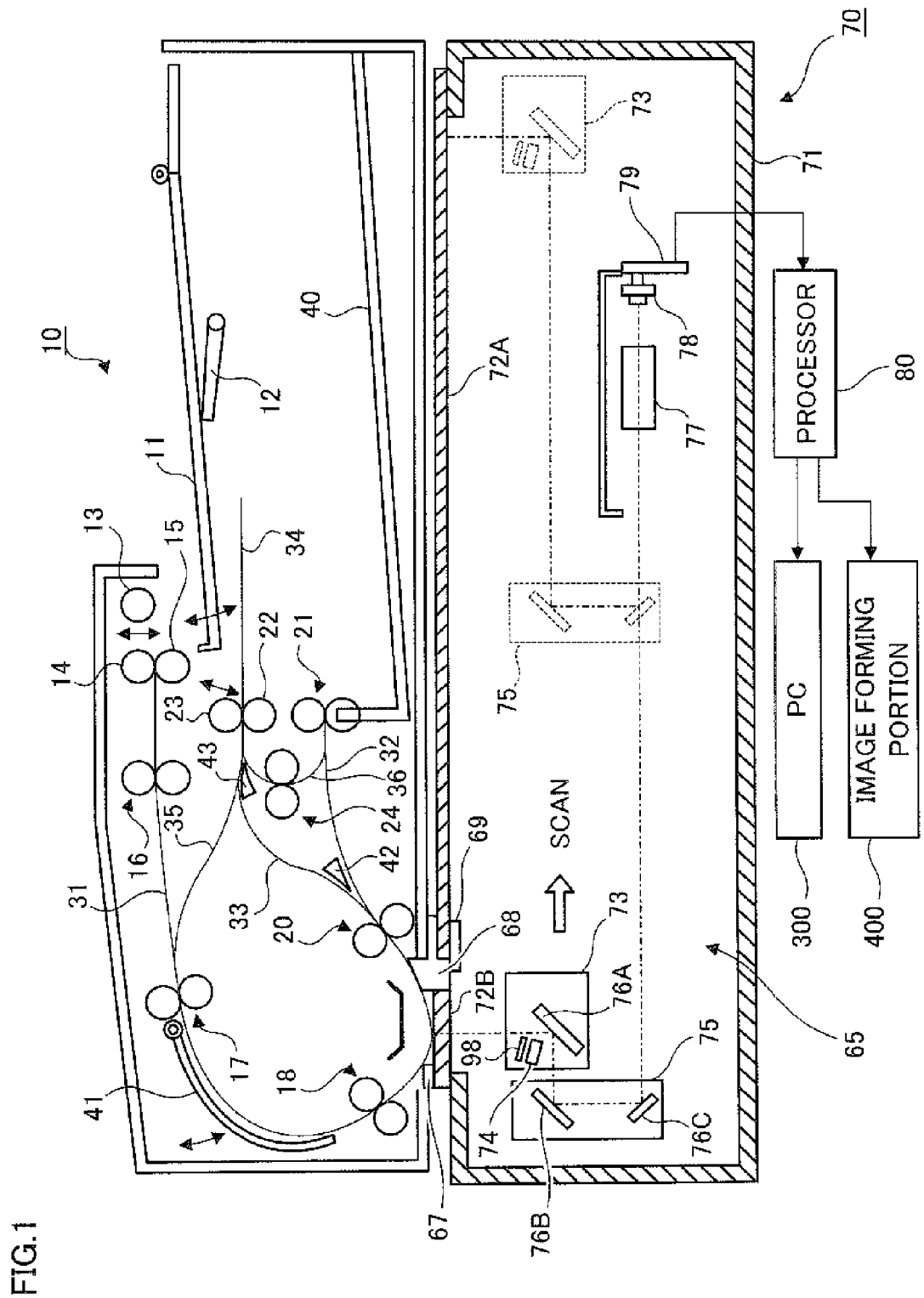
FIG. 1 is a diagram showing an image scanning apparatus to which the exemplary embodiment is applied.

FIG. 1 is a diagram showing an image scanning apparatus to which the present exemplary embodiment is applied. The image scanning apparatus is roughly classified into: a document feeder 10 that sequentially transports stacked documents; a scanner 70 that reads images by scanning; and a processor 80 that processes images signals thus read.

The document feeder 10 includes: a document stacking portion 11 on which a document bundle composed of plural documents is stacked; and a lifter 12 that raises and lowers the document stacking portion 11. The document feeder 10 also includes a transport roll 13 that transports the documents on the document stacking portion 11 raised by the lifter 12; a feed roll 14 that transports further downstream the documents transported by the transport roll 13; and a retard roll 15 that separates one by one the documents fed through the transport roll 13.

A first transport path 31 on which the documents are first transported is provided with take-away rolls 16, pre-registration rolls 17, registration rolls 18 and out rolls 20. The take-away rolls 16 transport each of the documents thus separated one by one toward rolls on the downstream side thereof. The pre-registration rolls 17 transport the document toward rolls on the downstream side thereof and form a loop of the document. The registration rolls 18 restart rotating in conjunction with the start timing of scanning after a temporary halt and feed the document while performing registration adjustment with respect to a second platen glass 72B to be described later. The out rolls 20 are provided on the downstream side of the second platen glass 72B in a transport direction of the document and transport the scanned document further downstream. The first transport path 31 is also provided with a baffle 41 rotating about a pivot in accordance with a state of the loop of the document being transported. Further, a contact image sensor (CIS) (not shown) reading the rear surface of the document being transported is provided at a position facing a guiding member 68 to be described later.

At the downstream side of the out rolls 20, a second transport path 32 and a third transport path 33 are provided. Also provided are: a transport-path switching gate 42 that switches the transport path between the second and third transport paths 32 and 33; a document exit portion 40 on which documents whose scanning is finished are stacked; and first exit rolls 21 that output the documents toward the document exit portion 40. Also provided are: a fourth transport path 34 on which each of the documents having passed through the third transport path 33 is caused to switch back; an inverter roll 22 and an inverter pinch roll 23 that are provided on the fourth transport path 34 and actually cause the document to switch back; and a fifth transport path 35 that is used to guide the document having switched back on the fourth transport path 34 to the first transport path 31 again, which includes the pre-registration rolls 17 and the like. Also provided are: a sixth transport path 36 that is used to output the document having switched back on the fourth transport path 34 to the document exit portion 40; second exit rolls 24 that are provided on the sixth transport path 36 and transport the document, which is inverted and to be outputted, toward the first exit rolls 21; and an exit switching gate 43 that switches the transport path between the fifth and sixth transport paths 35 and 36.

The transport roll 13 is lifted up and held in a retracted position during standby, and is lowered to a nip position (document transport position) during document transportation so as to transport the uppermost document on the document stacking portion 11. The transport roll 13 and the feed roll 14 transport the document by the engagement of feed clutches (not shown). The pre-registration rolls 17 form a loop of the document by causing the leading end of the document to abut against the registration rolls 18 being halted. On the loop formation, the registration rolls 18 move the leading end of the document, which has been caught into the registration rolls 18, back to the nip position.

Once the above-mentioned loop is formed, the baffle 41 opens about the pivot to function so as not to interfere with the loop formed in the document. The take-away rolls 16 and the pre-registration rolls 17 hold the loop of the document during scanning. The loop formation allows adjusting the timing of scanning and suppressing skew which accompanies document transportation in scanning, thus enhancing the alignment adjustment feature. In conjunction with the start timing of scanning, the registration rolls 18 at rest start rotating and the document is guided above the second platen glass 72B (to be described later), so that image data is read from below by use of a CCD image sensor 78 to be described later.

On completion of scanning of a one-sided document and on completion of simultaneous duplex scanning of a double-sided document, the transport-path switching gate 42 is switched to guide the document having passed through the out rolls 20 to the second transport path 32 and to output the document to the document exit portion 40. In sequential scanning of a double-sided document, on the other hand, the transport-path switching gate 42 is switched to guide the document to the third transport path 33 in order to invert the document. In the sequential scanning of a double-sided document, the inverter pinch roll 23 is released from a nip state thereof with feed clutches (not shown) turned off and retracted, and guides the document to the fourth transport path 34. The inverter pinch roll 23 is thereafter placed in the nip state, and guides the document inverted by the inverter roll 22 to the pre-registration rolls 17 as well as transports the document, which is inverted and to be outputted, toward the second exit rolls 24 on the sixth transport path 36.

The scanner 70 supports the above-mentioned document feeder 10 from below. Specifically, the scanner 70 supports the document feeder 10 from below by way of a device frame 71. In the device frame 71 constituting a housing, the scanner 70 includes: a first platen glass 72A on which a document whose image is to be scanned is placed at rest; and the second platen glass 72B that includes an opening portion for light used to scan a document being transported by the document feeder 10. The guiding member 68 guiding the document transported by the document feeder 10 is provided between the first and second platen glasses 72A and 72B. A white reference plate 69 (an example of a reference member) is disposed below the guiding member 68 to extend in a first scan direction. The white reference plate 69 has a white surface to be used as a reference in shading correction.

Additionally, the scanner 70 includes an image scanning part 65 as an example of an image scanning unit. The image scanning part 65 includes: a full-rate carriage 73 that stays still under the second platen glass 72B or scans across the entire first platen glass 72A to read an image; and a half-rate carriage 75 that provides light obtained from the full-rate carriage 73 to an image formation part. The full-rate carriage 73 is provided with a light source 74 that irradiates a document with light. The full-rate carriage 73 is also provided with a diffusion plate 98 (an example of a diffusing member). The diffusion plate 98 is arranged in the first scan direction, is formed into a plate shape, has one surface subjected to roughening, such as sandblasting, and diffuses light from the light source 74. The full-rate carriage 73 is also provided with a first mirror 76A that receives reflected light obtained from the document. Further, the half-rate carriage 75 includes a second mirror 76B and a third mirror 76C that provide the light obtained from the first mirror 76A to the image formation part.

The image scanning part 65 also includes: an image forming lens 77 that optically reduces an optical image obtained from the third mirror 76C; the charge coupled device (CCD) image sensor 78 (an example of a light receiving portion) that receives light from the image forming lens 77 and photoelectrically converts an optical image formed by the image forming lens 77; and a driving substrate 79 on which the CCD image sensor 78 is mounted. Image signals obtained by the CCD image sensor 78 are transmitted to the processor 80 through the driving substrate 79. That is, in the scanner 70, an image is formed on the CCD image sensor 78 by use of a so-called minification optical system.

The CCD image sensor 78 includes three line sensors (not shown) corresponding to three colors R, G and B so as to be capable of detecting components of the three colors R, G and B. Each of the line sensors is provided to extend in the first scan direction. Additionally, each of the line sensors includes a large number of photoelectric conversion elements (photodiodes (PDs), light receiving elements) arrayed in the first scan direction. More specifically, the CCD image sensor 78 has three line sensors arrayed at predetermined intervals, each of the line sensors including n number of photoelectric conversion elements arrayed in the first scan direction.

The image signals transmitted to the processor 80 are subjected to predetermined processing and then transmitted to a personal computer (PC) 300 or an image forming portion 400. In the image forming portion 400, for example, an image is formed on a recording medium such as a sheet by an electrophotographic system, for example. Note that the full-rate carriage 73 and the half-rate carriage 75 are moved in a second scan direction by a guide mechanism and a power transmission mechanism formed of a wire, a pulley and the like, whose illustration is omitted. The full-rate carriage 73 and the half-rate carriage 75 are moved in the second scan direction by a common carriage motor (not shown).

When an image of a document placed on the first platen glass 72A is scanned, the full-rate carriage 73 and the half-rate carriage 75 move in a scan direction (a direction indicated by an arrow in FIG. 1) at a ratio of 2:1. At this time, light from the light source 74 of the full-rate carriage 73 is emitted to a scanning target surface of the document, and reflected light from the document is reflected by the first mirror 76A, the second mirror 76B, and the third mirror 76C in this order and is guided to the image forming lens 77. The light guided to the image forming lens 77 then forms an image on a light receiving face of the CCD image sensor 78. The full-rate carriage 73 then moves in the scan direction (the second scan direction) to scan the next line of the document. Document scanning over one page is completed by repeating the above process over the entire document.

Meanwhile, the second platen glass 72B is made of a transparent glass plate in the form of a long plate, for example. In the present exemplary embodiment, a document transported by the document feeder 10 passes on the second platen glass 72B. In this event, the full-rate carriage 73 and the half-rate carriage 75 stay still in respective positions indicated by solid lines in FIG. 1. As mentioned in addition, the full-rate carriage 73 is located under the second platen glass 72B.

When an image of a document transported by the document feeder 10 is scanned, reflected light of the first line of the document forms an image at the image forming lens 77 through the first to third mirrors 76A, 76B and 76C, and the image is read by the CCD image sensor 78. Specifically, image data corresponding to one line in the first scan direction of the document being transported by the document feeder 10 is concurrently processed by the CCD image sensor 78, which is a one-dimensional sensor. Then, the next line in the first scan direction of the document is read. In the present exemplary embodiment, document scanning over one page in the second scan direction is completed when the trailing end of a document passes through a scanning position of the second platen glass 72B after the leading end of the document reaches the scanning position of the second platen glass 72B.

Figure 2:
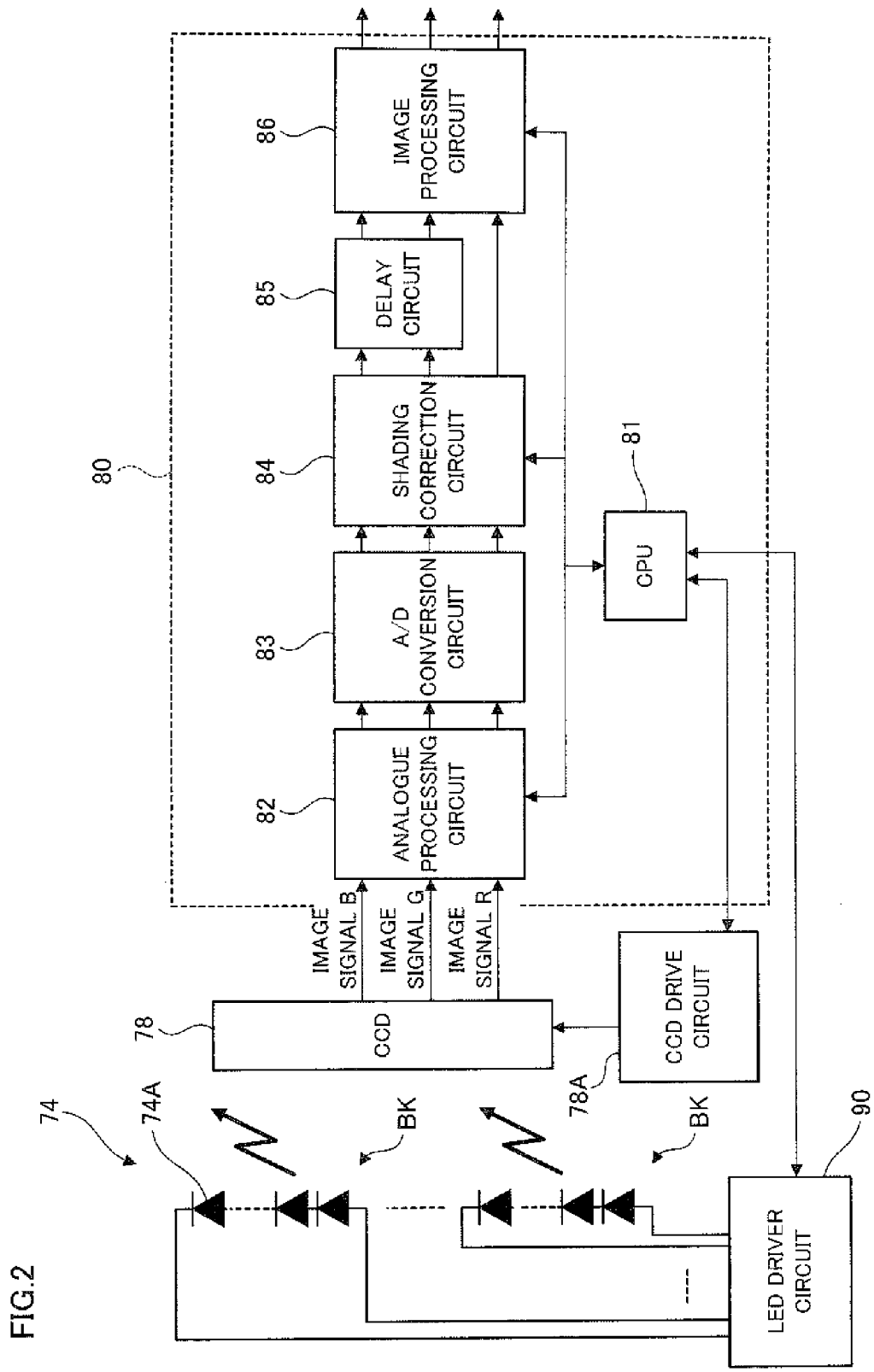
FIG. 2 is a block diagram showing details of the processor.

FIG. 2 is a block diagram showing details of the processor 80. The CCD image sensor 78, the light source 74 and the like are also shown in this figure.

The processor 80 includes: a CPU 81 controlling the entire processor 80; an analogue processing circuit 82; an A/D conversion circuit 83; a shading correction circuit 84; a delay circuit 85; and an image processing circuit 86. Although not described above, the image scanning apparatus of the present exemplary embodiment is provided with a CCD drive circuit 78A driving the CCD image sensor 78, as shown in FIG. 2. The CCD drive circuit 78A outputs a drive signal to the CCD image sensor 78 and thereby causes the CCD image sensor 78 to output image signals R, G and B. Additionally, in the present exemplary embodiment, the light source 74 is formed of plural light emitting diodes (LEDs) 74A (an example of light emitting elements), and an LED driver circuit 90 driving the light source 74 is provided.

The CPU 81 controls the analogue processing circuit 82, the shading correction circuit 84, the image processing circuit 86, the CCD drive circuit 78A, the LED driver circuit 90 and the like, and receives output signals from these circuits. The analogue processing circuit 82 performs processing, such as amplification, on analogue image signals of RGB outputted from the CCD image sensor 78. The A/D conversion circuit 83 converts the analog image signals of RGB outputted from the analogue processing circuit 82 to digital image signals. The shading correction circuit 84, which is an example of a correction unit, performs shading correction on the digital image signals of RGB outputted from the A/D conversion circuit 83. Then, the digital image signals of RGB subjected to shading correction by the shading correction circuit 84 are inputted to the delay circuit 85. The image signals outputted from the delay circuit 85 are inputted to the image processing circuit 86.

The shading correction is processing for correcting unevenness in an optical distribution of the CCD image sensor 78 (for example, unevenness in sensitivity of each of the photoelectric conversion elements forming the CCD image sensor 78) and unevenness in light quantity of the light source 74. The shading correction is usually performed on the basis of shading data collected in advance. The shading data, which is an example of light quantity information, is acquired by scanning the white reference plate 69 (see FIG. 1) with the CCD image sensor 78. In the present exemplary embodiment, a scanning result of a document is corrected for each pixel on the basis of the shading data, thereby to remove the above unevenness.

The above delay circuit 85 delays the image signals G and B outputted from the shading correction circuit 84, by delay time periods corresponding to the four line distance and the eight line distance, respectively, for example, and outputs the signals as image data in phase with the image data R. Additionally, the image processing circuit 86 performs image processing, such as scaling, ground color removal and binarization, on the image signals G and B outputted from the delay circuit 85 and the image signal R outputted from the shading correction circuit 84.

The light source 74 is now described in detail.

The light source 74 of the present exemplary embodiment includes the plural light emitting diodes (LEDs) 74A arrayed in the first scan direction. In the present exemplary embodiment, part of the LEDs 74A among the plural LEDs 74A are connected in series to form one block BK (a light emitting element group). Additionally, in the present exemplary embodiment, plural blocks BK are provided and each of the blocks BK is connected to the LED driver circuit 90. In the present exemplary embodiment, light-up control is performed on each of the blocks BK by the LED driver circuit 90. Furthermore, the LED driver circuit 90 of the present exemplary embodiment monitors a voltage value or a current value of each of the blocks BK. In the present exemplary embodiment, this makes it possible to detect that some of the blocks BK have changed to an OFF state due to abnormality, such as a breakdown of the LEDs 74A. The LED driver circuit 90 may be regarded as a detecting unit that detects reduction in output at a part of the light source 74. The LED driver circuit 90 may also be regarded as an abnormality detecting unit that detects abnormality of the LEDs 74A.

Figure 3:
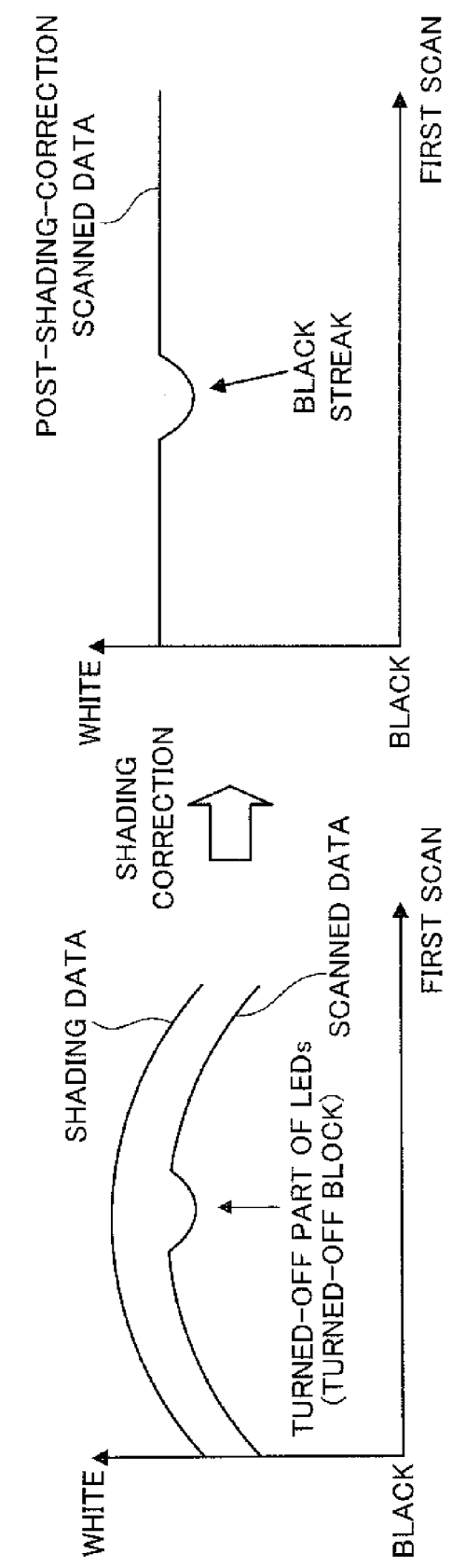
FIGS. 3A and 3B are diagrams illustrating a scanning result in a case where there has been a turn-off.

If some of the blocks BK change to the OFF state due to a breakdown or the like of the LEDs 74A, black streaks are generated in image signals (a scanned image), as shown in FIG. 3B (a diagram illustrating a scanning result in a case where there has been a turn-off). In the present exemplary embodiment, the shading correction circuit 84 performs shading correction. However, in this case, the shading correction is performed by using shading data acquired before the blocks BK change to the OFF state (see FIG. 3A), and thus generation of the above black streaks may not be prevented.

Therefore, the image scanning apparatus of the present exemplary embodiment reacquires shading data if the LED driver circuit 90 detects that some of the blocks BK have changed to the OFF state. To reacquire shading data, the full-rate carriage 73 is first moved below the white reference plate 69 (see FIG. 1). The light source 74 is then caused to irradiate the white reference plate 69 with light. After that, image signals outputted from the CCD image sensor 78 are acquired. By this operation, new shading data (new light quantity information) is acquired by the shading correction circuit 84.

Figure 4:
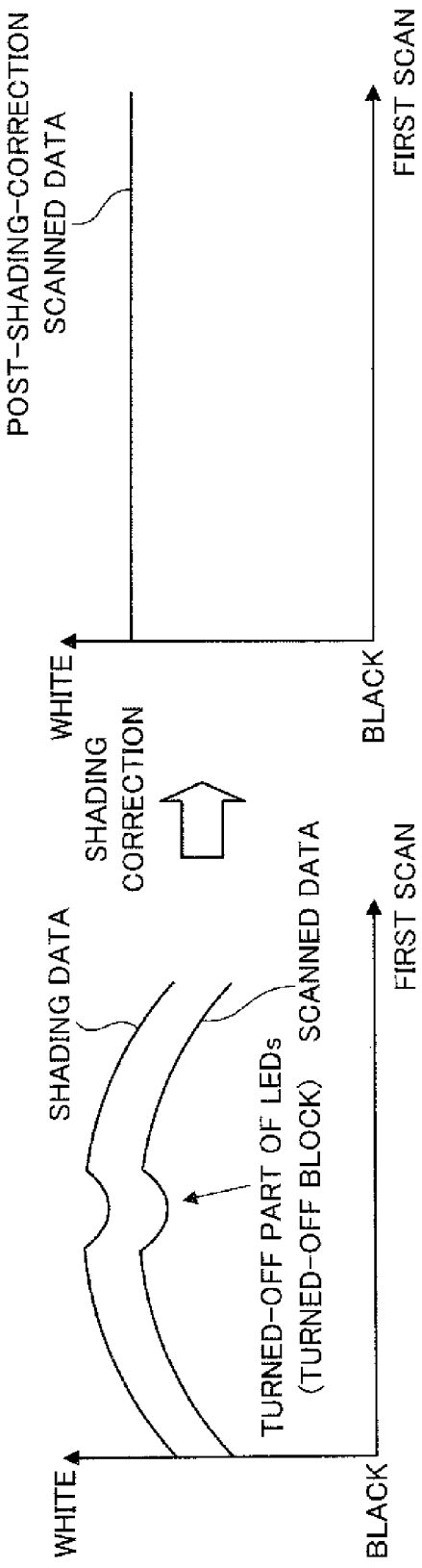
FIGS. 4A and 4B are diagrams showing reacquired shading data and a result of shading correction by using this reacquired shading data.

FIGS. 4A and 4B are diagrams showing reacquired shading data and a result of shading correction by using this reacquired shading data. FIG. 4A shows shading data acquired when part of the blocks BK are in the OFF state. If part of the blocks BK are in the OFF state, the reacquired shading data has a dark region at a position corresponding to the turned-off blocks BK. If such shading data is acquired, this is set as a reference white level. Thus, even if part of the blocks BK are in the OFF state, an output level of image signals after shading correction becomes constant, as shown in FIG. 4B. In the above description, shading data is reacquired when some of the blocks BK have changed to the OFF state; however, shading data may also be reacquired when brightness of some of the blocks BK is reduced. That is, shading data may be reacquired when there is reduction in output of some of the blocks BK, such as occurrence of the OFF state and reduction in brightness. Whether brightness is reduced or not may be detected by the LED driver circuit 90, for example, monitoring the voltage value or the current value of each of the blocks BK.

Now, the acquiring process of shading data is further described.

Figure 5:
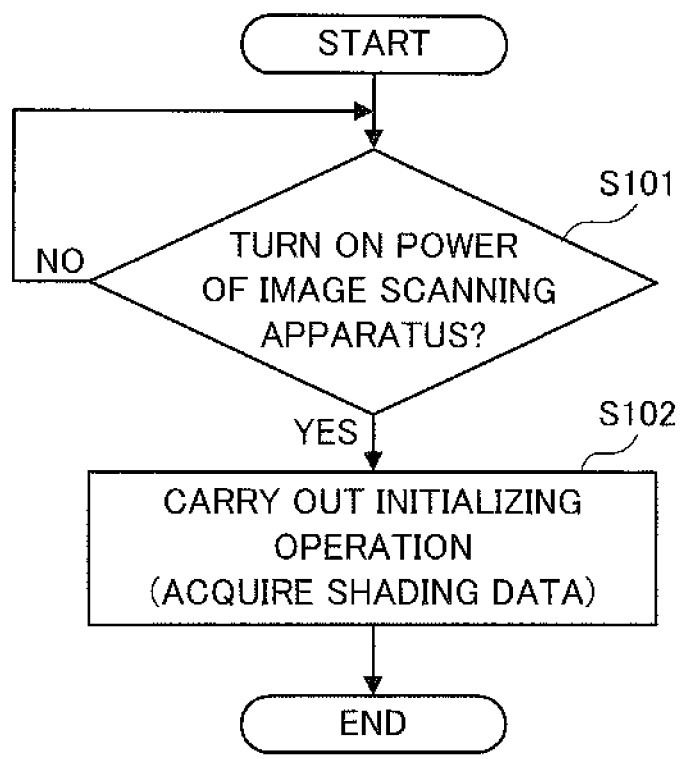
FIG. 5 is a flowchart showing the acquiring process of shading data.

FIG. 5 is a flowchart showing the acquiring process of shading data.

In the image scanning apparatus of the present exemplary embodiment, the CPU 81 determines whether or not the power of the image scanning apparatus gets turned on (Step 101). If the CPU 81 determines that the power of the image scanning apparatus gets turned on, the CPU 81 carries out an initializing operation (Step 102), and then the process is finished.

In the present exemplary embodiment, the acquiring process of shading data is included in the initializing operation. The CPU 81, which functions as a part of the light quantity information acquiring unit, also carries out the acquiring process of shading data when carrying out the initializing operation in Step 102. As described above, the acquiring process of shading data is carried out by causing the light source 74 to irradiate the white reference plate 69 (see FIG. 1) with light and acquiring image signals outputted from the CCD image sensor 78. In this way, in the present exemplary embodiment, the acquiring process of shading data is carried out when the power of the image scanning apparatus gets turned on. Accordingly, if part of the blocks BK have already been in the OFF state (a breakdown state) when the power gets turned on, shading data corresponding to this OFF state will be acquired.

Figure 6:
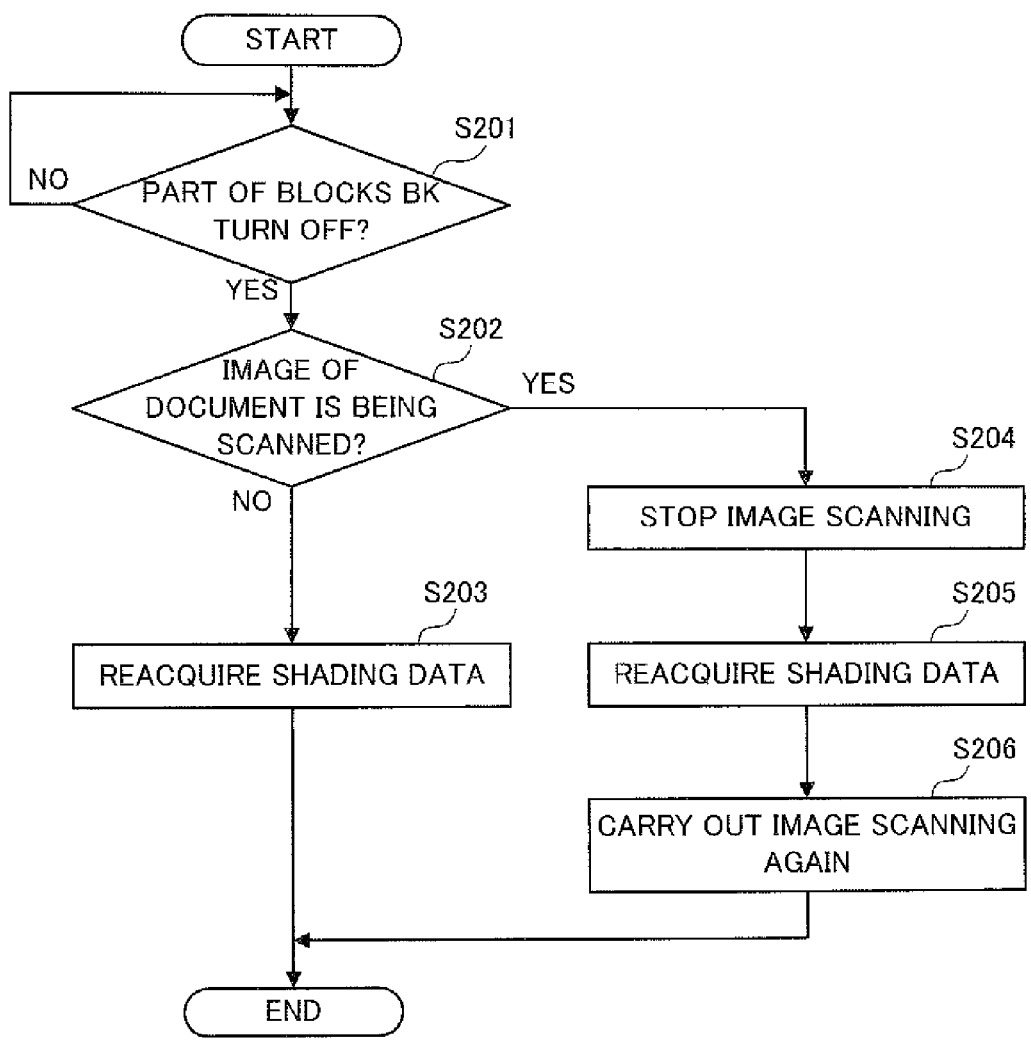
FIG. 6 is a flowchart showing a process carried out after the initializing operation.

FIG. 6 is a flowchart showing a process carried out after the initializing operation.

After the initializing operation is finished, the CPU 81 monitors output from the LED driver circuit 90 and determines whether or not part of the blocks BK turn off, on the basis of this output (Step 201). If the CPU 81 determines that part of the blocks BK turn off, the CPU 81 then determines whether or not an image of a document is being scanned (Step 202). If the CPU 81 determines that an image of a document is not being scanned, the CPU 81 reacquires shading data (Step 203), and the process is finished. As described above, reacquisition of shading data is carried out by causing the light source 74 to irradiate the white reference plate 69 (see FIG. 1) with light and acquiring image signals outputted from the CCD image sensor 78. By this operation, shading data as shown in FIG. 4A is acquired.

Meanwhile, if the CPU 81 determines that an image of a document is being scanned in Step 202, the CPU 81 stops (suspends) this image scanning of the document through an unillustrated image scanning controller (Step 204). After that, reacquisition of shading data is carried out in the same manner as described above (Step 205). Then, the CPU 81 again carries out image scanning of the document of which the image scanning is stopped in Step 204 (Step 206).

As mentioned in addition, image scanning of the document of which the image scanning is stopped in Step 204 is restarted from the beginning. For example, if the document is placed on the first platen glass 72A (see FIG. 1), the image scanning of this document is restarted from the beginning. Performing this operation prevents generation of black streaks in a part of the scanned image. If part of the blocks BK have turned off while a document being transported by the document feeder 10 (see FIG. 1) is being scanned, a notification that is a prompt to reset the document may be displayed on an unillustrated user interface (UI). Thereby, image scanning of the document being transported by the document feeder 10 may also be restarted from the beginning.

There has also been proposed an image scanning apparatus that continues the scanning operation without further processing if a turned-off block BK is placed at a position other than a position facing a document. For example, if the document size is small and the turned-off block BK is placed on an edge portion of the light source 74, the turned-off block BK is placed at a position other than the position facing a document. In this case, it is possible to scan an image of a document and to prevent occurrence of downtime. However, with this configuration, if the turned-off block BK is placed at the position facing a document, it is difficult to continue the image scanning of a document, which leads to occurrence of downtime. On the other hand, in the present exemplary embodiment, the image scanning may be continued by reacquiring shading data, even if the turned-off block BK is placed at the position facing a document. Accordingly, in the present exemplary embodiment, occurrence of downtime may be reduced.

Additionally, in the present exemplary embodiment, the diffusion plate 98 is provided to diffuse light from the LEDs 74A arrayed in the light source 74, as shown in FIG. 1. Since the light emitted from the LEDs 74A arrayed in the light source 74 has directionality, if a document is irradiated directly with the light from the LEDs 74A, there will be large variations in light quantity in the first scan direction. For this reason, in the present exemplary embodiment, the diffusion plate 98 is provided between the light source 74 and a document, thereby to make light quantity uniform in the first scan direction.

If part of the blocks BK turn off as described above on condition that there is no diffusion plate 98, a position at which the turn-off occurs becomes darker. As mentioned in addition, variations in light quantity becomes larger. Here, in the present exemplary embodiment, shading data is reacquired. However, if shading correction is performed by using the shading data reacquired under the condition of large variations in light quantity as described above, the quality of the shading correction tends to be lowered as compared with a case where shading data reacquired under the condition of small variations in light quantity is used. Provision of the diffusion plate 98 as in the present exemplary embodiment allows reacquisition of shading data under the condition of small variations in light quantity, and thus improvement in quality of the shading correction.

Light quantity of the light source 74 may vary as time goes by. Thus, if originally acquired shading data is used without any modification, shading correction may not be appropriately performed in some cases. Accordingly, it is desirable that the shading data itself be corrected. Shading data may be corrected by integrating a ratio (a light quantity variation ratio) into the shading data, for example. Here, the light quantity variation ratio is a ratio of white reference data acquired when the power gets turned on (which may be hereinafter referred to as "white reference data at initialization time") to white reference data acquired just before document scanning. A case has been described above as an example where shading data is reacquired when part of the blocks BK have turned off; however, the above white reference data at initialization time may be reacquired in addition to the shading data. Note that the white reference data is acquired by scanning the white reference plate 69 as in the case of the shading data.

Whether or not there is a turned-off block BK may be detected at predetermined time intervals. Here, whether or not there is a turned-off block BK may be detected, for example, when a user gives an instruction to start image scanning. However, if part of the blocks BK are turned off when the instruction to start image scanning is given, the image scanning is started after reacquisition of shading data. In this case, a time interval from the instruction to start image scanning to a start of the image scanning is lengthened. Detection at certain time intervals as described above increases the possibility that shading data is reacquired before a user gives the instruction to start image scanning. This reduces occurrence of a trouble that the time interval from the instruction to start image scanning to the start of the image scanning is lengthened.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanning apparatus comprising:
    an image scanning unit that includes:
        a plurality of light emitting elements; and
        a light receiving portion receiving light emitted from the plurality of light emitting elements and reflected on a document,
        wherein the image scanning unit scans an image on the document;
    a light quantity information acquiring unit that acquires information about a first quantity of light received by the light receiving portion as initial light quantity information while causing the plurality of light emitting elements to irradiate a reference member with light;
    a correction unit that corrects the image scanned by the image scanning unit, on the basis of the light quantity information acquired by the light quantity information acquiring unit; and
    an abnormality detecting unit that detects abnormality of the light emitting elements,
    wherein, in response to the abnormality detecting unit detecting abnormality of the light emitting elements, the light quantity information acquiring unit acquires information about a second quantity of light received by the light receiving portion as new light quantity information while causing the plurality of light emitting elements to irradiate the reference member with light, and
    wherein the correction unit corrects the image scanned by light emitted from the light emitting elements of which the abnormality is detected, using the new light quantity information corresponding to the light emitting elements of which the abnormality is detected, in response to the abnormality of the light emitting elements being detected by the abnormality detecting unit.

2. The image scanning apparatus according to claim 1, further comprising a diffusing member that diffuses the light emitted from the plurality of light emitting elements toward the document.

3. The image scanning apparatus according to claim 2, wherein in response to the abnormality of the light emitting elements being detected by the abnormality detecting unit while an image of a document is being scanned, the image scanning unit stops scanning the image and starts scanning the image from the beginning after the new light quantity information is acquired by the light quantity information acquiring unit.

4. The image scanning apparatus according to claim 3, wherein at predetermined time intervals, the abnormality detecting unit performs processing to detect whether the abnormality occurs or not.

5. The image scanning apparatus according to claim 2, wherein at predetermined time intervals, the abnormality detecting unit performs processing to detect whether the abnormality occurs or not.

6. The image scanning apparatus according to claim 1, wherein in response to the abnormality of the light emitting elements being detected by the abnormality detecting unit while an image of a document is being scanned, the image scanning unit stops scanning the image and starts scanning the image from the beginning after the new light quantity information is acquired by the light quantity information acquiring unit.

7. The image scanning apparatus according to claim 6, wherein at predetermined time intervals, the abnormality detecting unit performs processing to detect whether the abnormality occurs or not.

8. The image scanning apparatus according to claim 1, wherein at predetermined time intervals, the abnormality detecting unit performs processing to detect whether the abnormality occurs or not.

9. An image scanning apparatus comprising:
    an image scanning unit that includes a plurality of light emitting elements and a light receiving portion receiving light emitted from the plurality of light emitting elements and reflected on a document and scans an image on the document;
    a light quantity information acquiring unit that acquires initial light quantity information for shading correction by acquiring information about a first quantity of light received by the light receiving portion while causing the plurality of light emitting elements to irradiate a reference member with light;
    a correction unit that performs shading correction on the image scanned by the image scanning unit, using the light quantity information for shading correction acquired by the light quantity information acquiring unit; and
    an abnormality detecting unit that detects abnormality of the light emitting elements, wherein:
        in response to the abnormality detecting unit detecting abnormality of the light emitting elements, the light quantity information acquiring unit acquires new light quantity information for shading correction by again causing the plurality of light emitting elements to irradiate the reference member with light and newly acquiring information about a second quantity of light received by the light receiving portion, and
        the correction unit performs shading correction on the image scanned by the image scanning unit, using the new light quantity information for shading correction acquired by the light quantity information acquiring unit, in response to the abnormality of the light emitting elements being detected by the abnormality detecting unit.

10. The image scanning apparatus according to claim 9, wherein the light source is configured to have a plurality of light emitting element groups in each of which a plurality of light emitting elements are connected in series, and
    wherein the detecting unit detects the reduction in output at the part of the light source, using at least any one of a current value of a current supplied to each of the plurality of light emitting element groups and a voltage value of a voltage applied to each of the plurality of light emitting element groups.

11. The image scanning apparatus according to claim 10, wherein the reference member has a white surface, and wherein the light quantity information acquiring unit acquires data for shading correction by acquiring the new light quantity information.

12. The image scanning apparatus according to claim 9, wherein the reference member has a white surface, and wherein the light quantity information acquiring unit acquires data for shading correction by acquiring the new light quantity information.

13. The image scanning apparatus according to claim 9, wherein at predetermined time intervals, the abnormality detecting unit performs processing to detect whether the abnormality occurs or not.

14. An image scanning apparatus comprising:
an image scanning unit that includes:
a plurality of light emitting elements; and
a light receiving portion receiving light emitted from the plurality of light emitting elements and reflected on a document,
wherein the image scanning unit scans an image on the document;
a light quantity information acquiring unit that acquires information about a first quantity of light received by the light receiving portion as light quantity information while causing the plurality of light emitting elements to irradiate a reference member with light;
a correction unit that corrects the image scanned by the image scanning unit, using the light quantity information acquired by the light quantity information acquiring unit; and
an abnormality detecting unit that detects abnormality in output of the light emitting elements, wherein:
in response to the abnormality detecting unit detecting abnormality of the light emitting elements, the light quantity information acquiring unit acquires information about a second quantity of light received by the light receiving portion as new light quantity information while causing the light emitting elements to irradiate the reference member with light, and
the correction unit corrects the image scanned by the image scanning unit, using the new light quantity information acquired by the light quantity information acquiring unit, in response to the abnormality of the light emitting elements being detected by the abnormality detecting unit.

15. The image scanning apparatus according to claim 14, wherein at predetermined time intervals, the abnormality detecting unit performs processing to detect whether the abnormality occurs or not.

* * * * *